(12) United States Patent
Williams et al.

(10) Patent No.: US 7,500,531 B2
(45) Date of Patent: Mar. 10, 2009

(54) LOW SPEED AC MOTOR FOR DIRECT DRIVE APPLICATIONS

(75) Inventors: Kevin R Williams, Cypress, TX (US); Alvie E. Howard, Jr., Houston, TX (US); Daniel F. McNease, Montgomery, TX (US); Rudy Harris, Longview, TX (US); Richard Bradley, Cypress, TX (US)

(73) Assignee: LaTourneau Technologies Drilling Systems, Inc., Houston, TX (US)

( * ) Notice: Subject to any disclaimer, the term of this patent is extended or adjusted under 35 U.S.C. 154(b) by 0 days.

(21) Appl. No.: 11/538,352

(22) Filed: Oct. 3, 2006

(65) Prior Publication Data

US 2007/0267222 A1 Nov. 22, 2007

Related U.S. Application Data

(60) Provisional application No. 60/723,046, filed on Oct. 3, 2005.

(51) Int. Cl.
*E21B 3/00* (2006.01)
(52) U.S. Cl. .................... 175/122; 175/195
(58) Field of Classification Search ............. 175/113, 175/122, 162, 170, 195
See application file for complete search history.

(56) References Cited

U.S. PATENT DOCUMENTS

| 4,116,592 | A | | 9/1978 | Cherny et al. |
| 5,751,078 | A | | 5/1998 | Loewenthal |
| 6,153,959 | A | * | 11/2000 | Lorenzo ................. 310/162 |
| 6,798,104 | B2 | | 9/2004 | Kajiura et al. |
| 2004/0069497 | A1 | * | 4/2004 | Jones et al. ............. 166/379 |
| 2005/0269889 | A1 | * | 12/2005 | Tessier et al. ............ 310/166 |
| 2007/0175662 | A1 | * | 8/2007 | Kracik .................... 175/24 |

OTHER PUBLICATIONS

International Search Report for Corresponding International Patent Application No. PCT/US2005/35557.
Written Opinion for Corresponding International Patent Application No. PCT/US2005/35557.
AC motor-based drive system functions without gearboxes or pulse encoders, NASA Tech Briefs, Jun. 2003, retrieved from The Internet on Oct. 2, 2008, URL: http://findarticles.com/p/articles/mi_qa3957/is_/ai_n9260091.

* cited by examiner

*Primary Examiner*—William P Neuder
(74) *Attorney, Agent, or Firm*—Akin Gump Strauss Hauer & Feld LLP

(57) ABSTRACT

A low speed alternating current motor having motor shaft speeds of about 300 is provided, and such motor has application in numerous industries and devices, such as, for example, in top drive drilling systems. Because of the low shaft speed, mechanical speed reduction equipment may not be necessary. In addition, the motor shaft may be hollow to facilitate the flow of fluid, such as, for example, drilling mud.

6 Claims, 11 Drawing Sheets

LOW SPEED AC MOTOR FOR DIRECT DRIVE APPLICATIONS

FIELD OF THE INVENTION

This disclosure relates generally to a low speed AC motor, and more particularly to a low speed, variable frequency, AC motor for use in direct drive applications, such as top drives.

BACKGROUND OF THE INVENTION

Industry has used AC motors as prime movers for many years. The typical AC motor is designed to operate at speeds of 3,000 TO 3,600 rpm or more. Many industrial applications and processes utilizing AC motors must reduce the motor speed, typically through mechanical gearing, before the power supplied by the motor can be used. In the oil field, for example, conventional top drive drilling systems may utilize a variable frequency AC motor as the prime mover. The AC motor is responsible for, among other things, supplying the torque needed to rotate the drill string and drill bit during drilling operations. The rotational speed of the bit and, therefore, the top drive is relatively low, typically between 100 and 300 rpm and more typically around 150 rpm. Conventional variable frequency AC motors used in top drive applications have motor speeds usually ten times the bit speed or 1000 to 3000 rpm. Thus, it is conventional for a top drive system to include speed reduction equipment, such as a gearbox, to reduce the rotational speed of the AC motor to a more usable rotational speed. Speed reduction equipment, such as the gearbox mentioned above, adds to the cost of the system, increases the service requirements, increases the number of parts that can fail, and increases the weight of the system.

This application for patent discloses a novel top drive drilling system using a low speed, variable frequency AC motor that does not require additional speed reduction equipment to achieve a rotational speed in the range of 100 to 300 rpm and is, therefore, particularly suited for direct drive applications.

SUMMARY OF THE DISCLOSURE

A top drive drilling system using a low speed AC motor is provided, which systems comprises a motor frame, a stator assembly affixed to the motor frame and comprising a plurality of stator laminations compressed into a stator core; a rotor assembly comprising a hollow-tubed spider having a plurality of ribs located on the outer surface and oriented such that the length of the ribs are coincident the length of the tube and a rotor core comprising a plurality of compressed rotor laminations affixed to the outer radial surface of the spider ribs; a hollow motor shaft to which the rotor assembly is coupled; and first and second bearing assemblies mounted between the motor frame and the motor shaft such that the rotor core may rotate relative to the stator assembly; and a motor drive for generating a pulse-width-modulated signal that spins the motor shaft at speeds less than about 500 rpm thereby avoiding speed reduction equipment to achieve a motor shaft speed in the range of about 100 to about 300 rpm

BRIEF DESCRIPTION OF THE DRAWINGS

The foregoing summary, detailed description of preferred embodiments, and other aspects of this disclosure will be best understood when read in conjunction with the accompanying drawings, in which.

Figure 1:
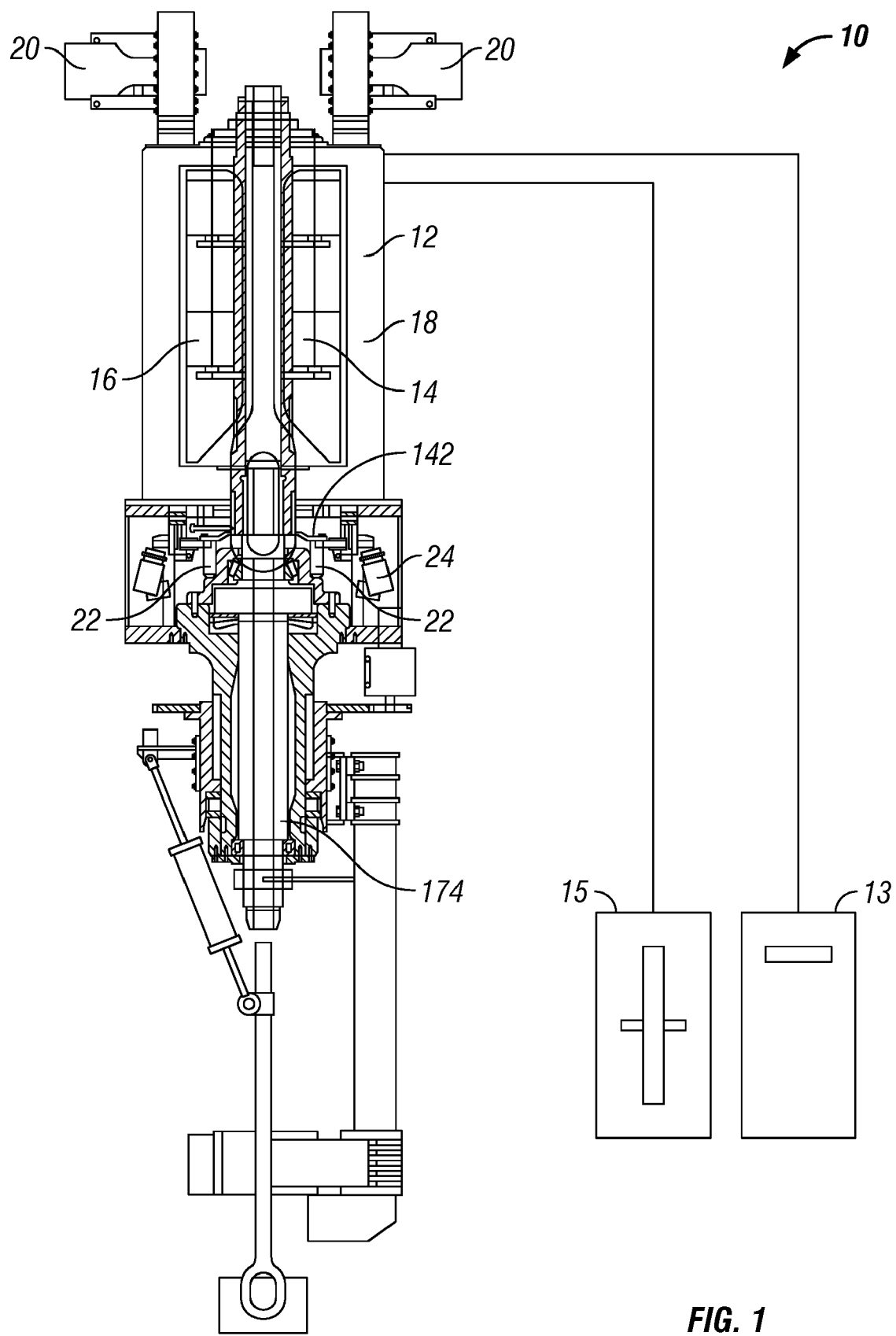
FIG. 1 illustrates a direct drive top drive drilling system according to the present invention.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art as required by 35 U.S.C. § 112.

DETAILED DESCRIPTION

In general terms, Applicants have created a new top drive drilling system that uses a low speed, variable frequency AC motor that does not require mechanical speed reduction equipment. The AC motor disclosed herein is capable of operating at speeds from 0 rpm to about 300 rpm and may be controlled by a conventional pulse width modulated (PWM) variable speed drive, such as Oilfield-Electric-Marine's commercially available V 3000 Active Energy Management Drive.

AC motors used in the present invention may find application in top drive drilling systems, such as described herein, and draw works systems used in the oil and gas exploration industries, drive systems for large mining vehicles, dredging equipment and many other applications where high torque and low speed power are required. For purposes of this application, a detailed description of a new and unique top drive drilling system will be presented. It must be understood that the present invention is not limited to use only in top drive systems just because that is the embodiment disclosed herein.

A motor according to the present inventions can be constructed having approximately 1500 horsepower and operating at speeds between 0 and about 300 rpm at 600 volts. The motor may be designed with 8 poles, wired in Delta fashion, with an inverter supply frequency of 10 Hz to achieve a base rpm of 150. This design results in a good balance of electromagnetic design and allows for a practical number of slots in the space available. Additionally, the motor shaft may be hollow to allow drilling mud to pass there through without the need for a separate piping system to bypass the motor. The motor bearings may be designed, and in the preferred embodiment are designed, to support only the rotor and brake assemblies and not the weight of the drill string. Motor cooling may be supplied by air or water circulation. Further, the motor can be mechanically braked, dynamically braked by dissipating energy into the PWM drive, braked by an energy recovering system, such as a flywheel, or a combination.

FIG. 1 represents a top drive drilling system 10 according to the present invention incorporating a low speed, direct drive AC motor 12. Also illustrated in FIG. 1 is a conventional variable frequency drive 13 capable of supplying a PWM driving signal to Motor 12 and dynamically breaking motor 12. Alternately, an energy recovering braking system 15 is also shown.

Figure 2:
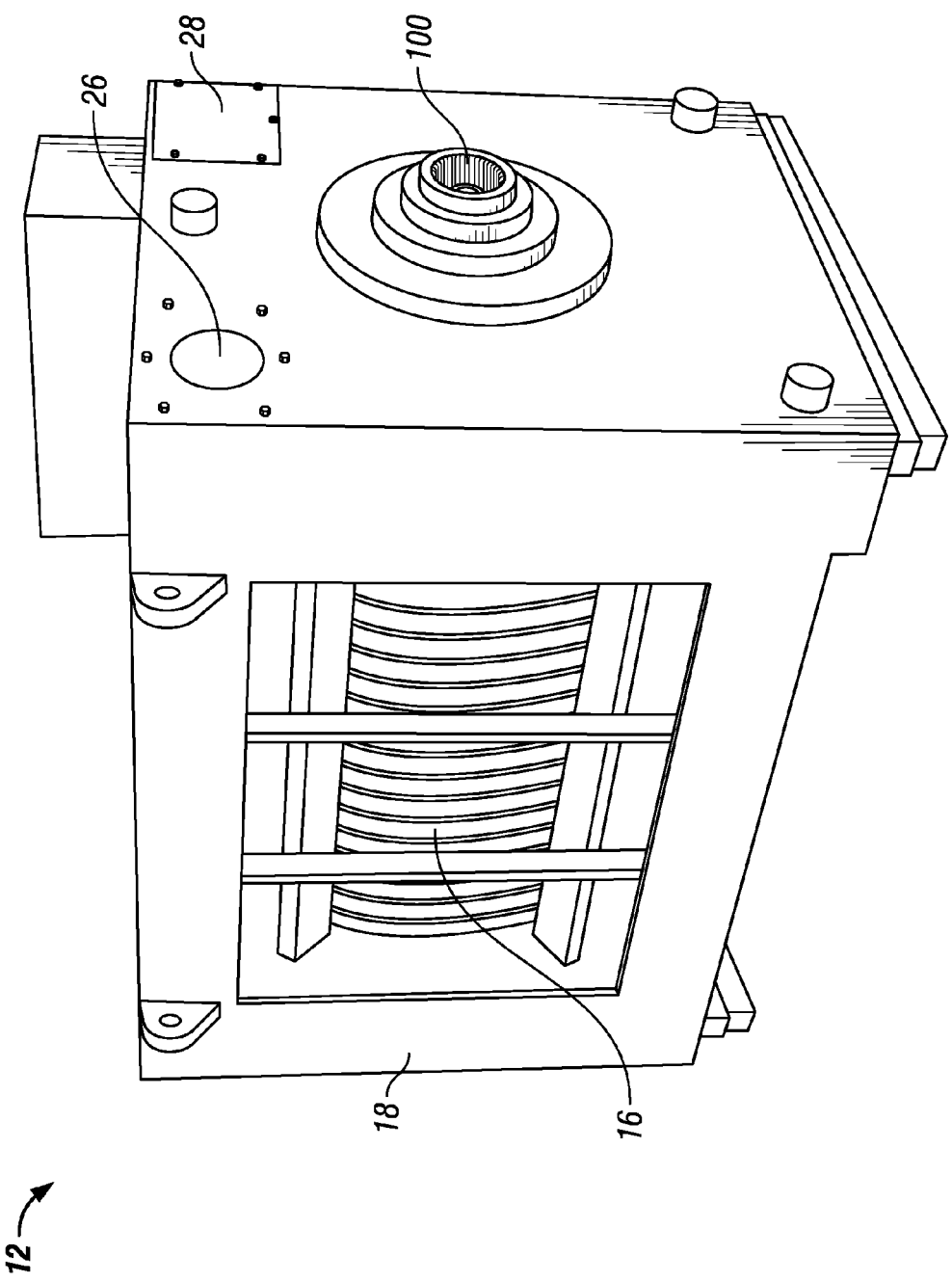
FIG. 2 illustrates an embodiment of an AC motor that may be used in top drive system illustrated in FIG. 1.

The motor 12 comprises a rotor assembly 14, a stator assembly 16, outer motor casing 18, cooling system 20, rpm encoders 22 and mechanical braking system 24. FIG. 2 illustrates a perspective view of a preferred embodiment of an AC motor suitable for use with the present inventions. The stator assembly 16 is seen positioned within the motor casing 18. The hollow motor shaft 100 is seen at the top end of the motor 12 along with the cooling ports 26 and 28. Not shown in FIG. 2 are the cooling air exhaust manifolds 156, which are located opposite each other over the exposed stator assembly 16.

Turning now to a more detail description of the stator assembly 16, the assembly may comprise laminates 40 (see FIG. 3) preferably made from 0.5 mm thick pre-coated electrical sheet steel rated at 400 watts/sq m at 50 Hz., such as a low silicon (Losil) carbon steel (470-50-A5, with LS coating). Reference may be made to British Specification BS 6404:Section 8.4. To minimize cost, the stator may be designed using single or continuous ring laminations. The alternative, which may be implemented in the present invention, is to create the stator laminates from a number of segments (not shown). This alternative, while viable, is not the preferred embodiment because it increases the part count and builds complexity and, therefore, results in a higher motor cost.

Figure 3:
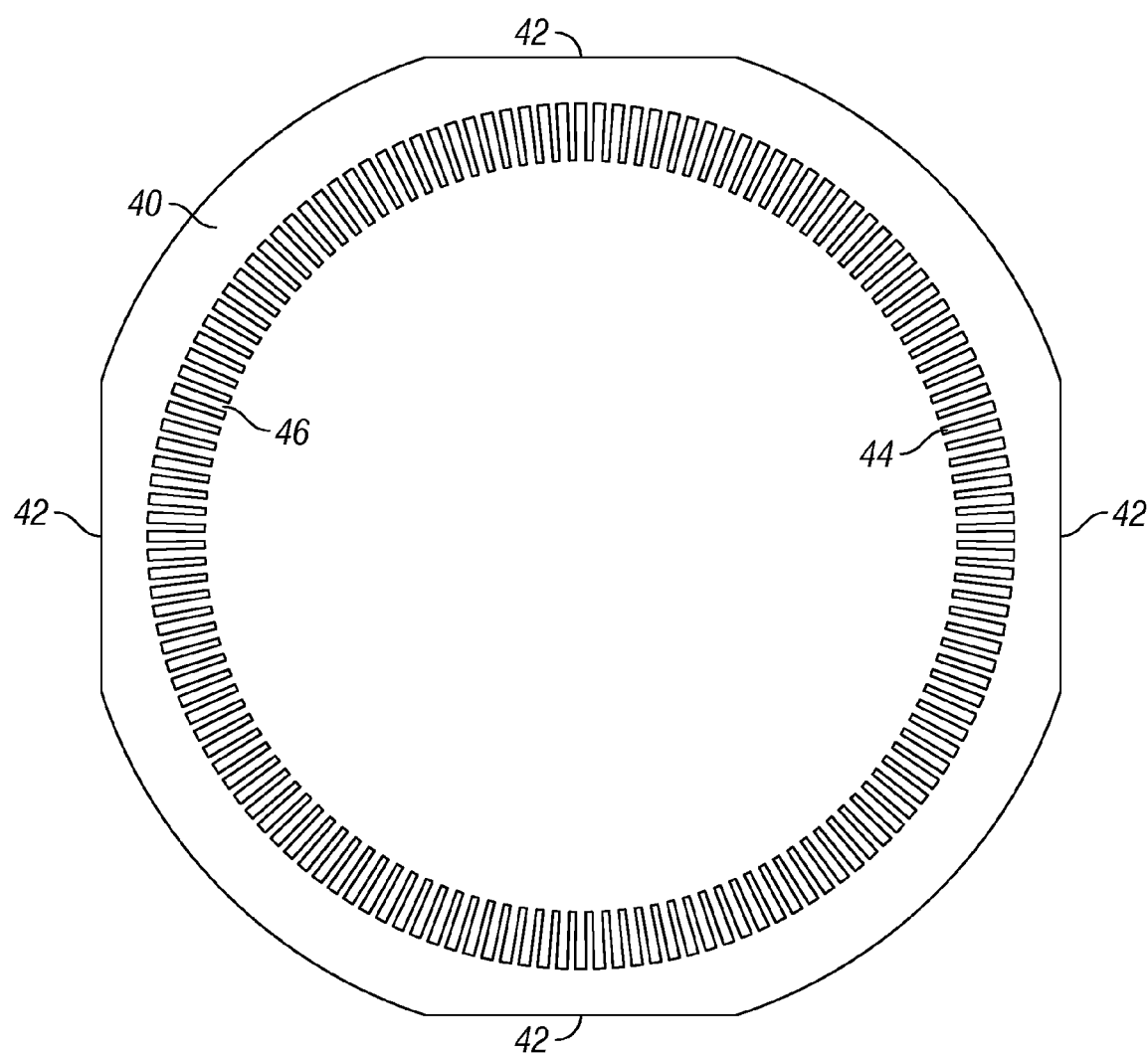
FIG. 3 illustrates a stator lamination for an AC motor according to the present invention.

Applicants have found that, typically, the laminate 40 material is commercially available in widths up to 1240 mm. Laminates 40 having a diameter greater than 1240 mm can be cut from these sheets resulting in a modified circular laminate 40 with four short flats 42. The preferred design is a truly circular laminate, but the modified laminate 40 shown in FIG. 3 is acceptable. When the modified laminate 40 of FIG. 3 is used, an effective diameter of about 1260 mm may be used in electrical design calculations. Of course, a more accurate effective diameter may be determined empirically by comparing the magnetic properties of the modified laminate 40 to unmodified circular laminates of various diameters, or analytically by calculating an effective diameter based on the area or other properties, such as flux density, lost by the flats. The smaller diameter of 1240 mm has an impact of the flux density in the stator core, and consequently on the magnetizing current, both of which can be and have been accounted for in the design. In practice, Applicants have found the flats 42 to have little impact since the majority of the laminate 40 is at the larger diameter. The increased diameter of laminate 40 has further benefits as it increases the area available for cooling. Each laminate 40 further comprises a plurality of teeth 44 and slots 46. In the embodiment being described, stator laminate 40 has 144 slots.

Figure 4:
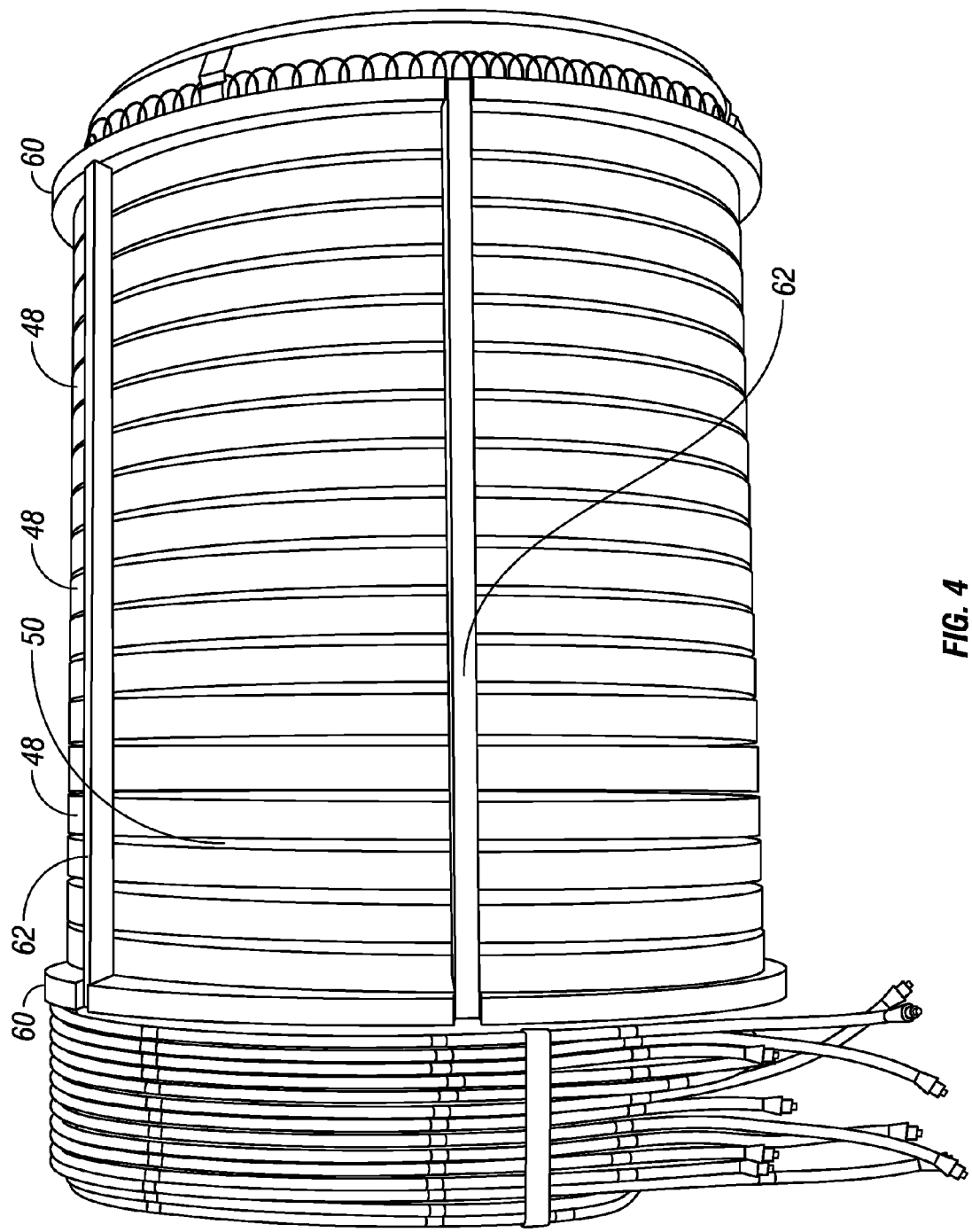
FIG. 4 illustrates a stator assembly for an AC Motor according to the present invention.

As shown in FIG. 4, the stator laminates 40 are preferably assembled into a plurality of stator packs 48, each pack comprising a plurality of individual laminates 40. In the embodiment presently described, each stator pack 48 comprises approximately 132 laminates 40 making the stator pack 48 some 66 mm thick. Each stator pack 48 may be spaced apart from its adjacent pack 48 to allow cooling air or fluid to circulate. The stator packs 48 may be separated by a plurality of radially oriented spacers 50. In the preferred embodiment, the spacers 50 are metal strips that are about 10 mm wide by 3 mm thick. The spacers may be affixed to the surface of the exposed adjacent laminates 40, preferably by welding. In the preferred embodiment, these strips form channels for the cooling system. The stator assembly 16 illustrated in FIG. 4 has 18 stator packs 48.

Figure 5:
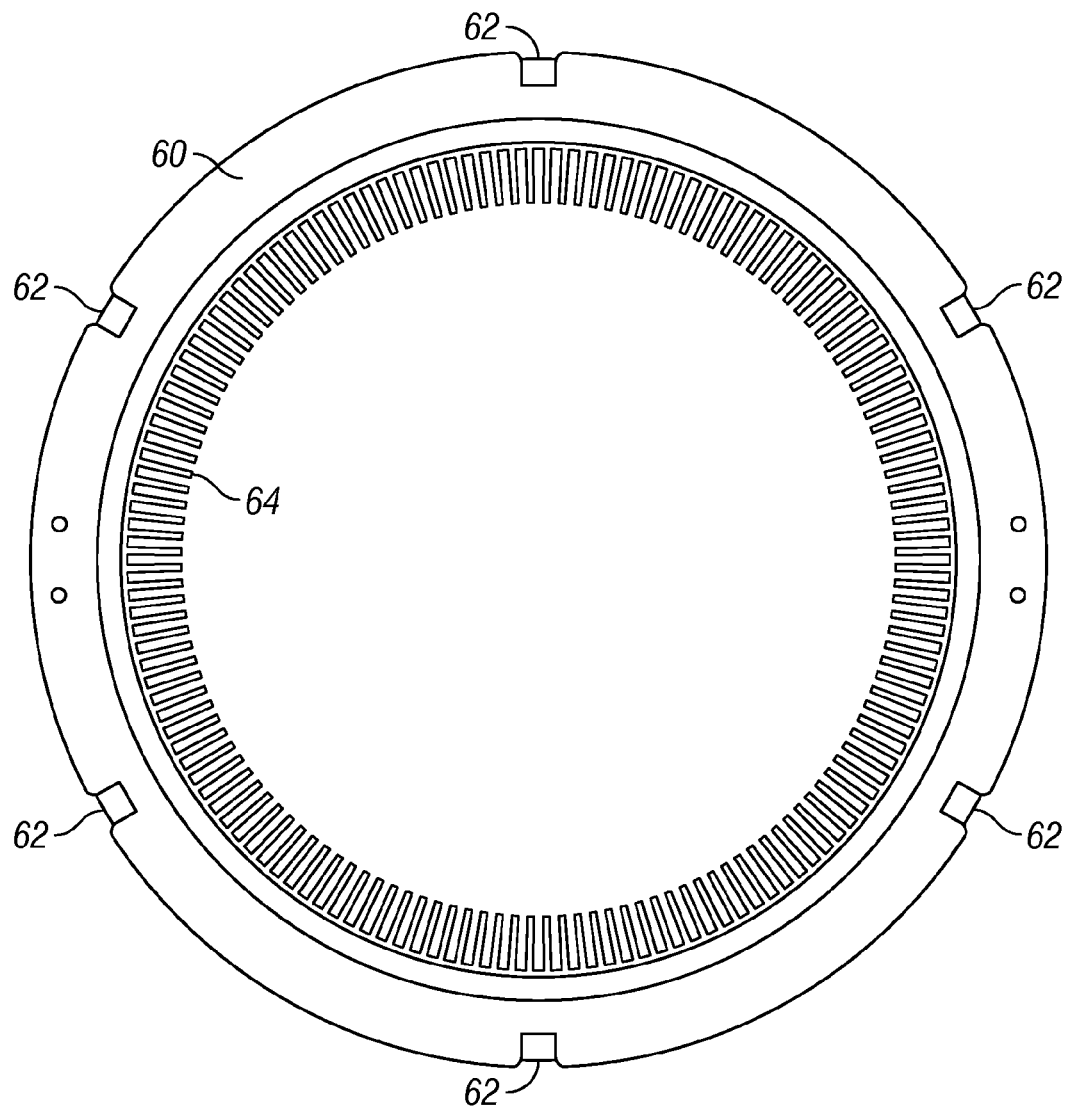
FIG. 5 illustrates an end view of a stator assembly for AC motor according to the present invention.

Turning to FIG. 5, the stator packs 48 may be held together between two compression plates 60, one at each end of the stator assembly 16. In the embodiment of FIG. 5, the stator assembly 16 is connected together by one or more links or bars 62. A transfer plate 64 having a profile substantially identical to laminate 40 is placed between the first stator pack 48 and the compression plate 60 and between the last stator pack 48 and another compression plate 60. The transfer plate 64 helps transfer compression to the entire assembly 16, for example, to each laminate tooth 44, to maintain the desired core pressure. In the preferred embodiment illustrated in FIG. 5, the compression plates 60 and transfer plates 64 are separate structures. Alternative designs may include a combination compression/transfer plate that substantially matches the profile of laminate 40 to effectively transfer compression to the entire assembly 16.

The one or more bars 62 may be affixed to the laminates 40 and/or the stator packs 48, and in the preferred embodiment, the bars 62 are welded to alternate stator packs 48. In the preferred embodiment, the stator assembly 16 is compressed to about 100 psi, with a hydraulic press for example, and the core bars 62 are affixed to stator packs 48 while the assembly is compressed. The spacers 50 and/or bars 62 may be modified, such as by cutting short, where they intersect or are adjacent one another to ensure that a closed pocket is not created, which would interfere with coolant circulation.

In the preferred embodiment, the stator coils are fully formed, lap wound with copper strip 2.9 mm thick by 8.2 mm wide. The stator coils are insulated, preferably using an insulation system comprising Kapton and mica insulation on the individual strips followed by mica and glass layer or coating on the total stator pack 48. The insulation system used on the copper strip (e.g., coils) is adequate for voltages at least up to 1500 volts. The insulation used on the stator assembly 16 provides additional dielectric protection and mechanical strength. The coils may be inserted into the laminate slots 46 in conventional fashion, such as with a slot liner. The coils may be fixed in place and in the preferred embodiment are held in place with glass wedges. The wound stator assembly may be vacuum pressure impregnated with an electrical resin, such as a class H resin, epoxy or polyester.

Figure 6:
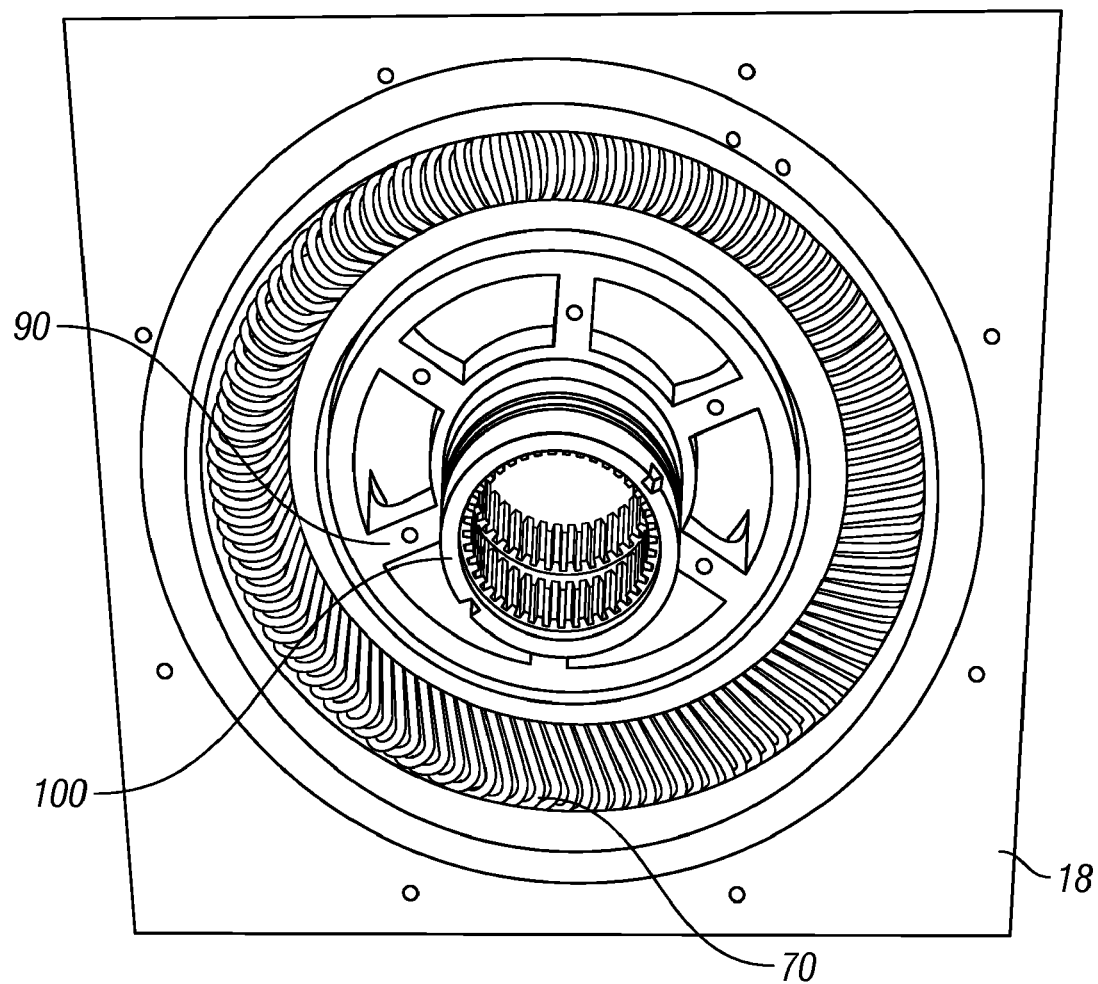
FIG. 6 illustrates an end view of a rotor assembly inside of a stator assembly in an AC motor according to the present invention.

The stator winding overhangs 70, such as shown in FIGS. 4 and 6, may be and preferably are braced against short circuit. The stator is preferably, but not necessarily, wound in Delta fashion with eight parallel circuits. In the preferred embodiment, the parallel circuits are connected at the ends of the winding overhangs onto twelve copper bus rings, effectively dividing the stator assembly 16 into six sections, with each section having two phases. Cables may be connected directly to the bus ring, such as by lugs, and the cables may be configurable such that the motor may be operated on a supply voltage of 600V or 1200V, as desired. See FIG. 4. The stator assembly may include temperature sensing devises and in the preferred embodiment includes six thermisters and six RTDs, one each per stator section. The temperature sensors may be used to provide feedback to the AC motor drive, such as a variable frequency drive.

The stator assembly 16 is positioned within the outer casing 18 as illustrated in FIG. 2. In the preferred embodiment the stator assembly is pressed into the motor casing 18 over a slight interference fit. An interference fit is usually sufficient to locate the stator relative to the frame and in the preferred embodiment, the interference fit is between the outer diameter of the compression plates 60 and the outer casing 18. The stator assembly 16 also may be dowelled or otherwise attached to the outer casing 18. In the preferred embodiment, a suitable number of spiraled dowels are used having a load bearing capacity of 500% of full load torque.

Figure 7:
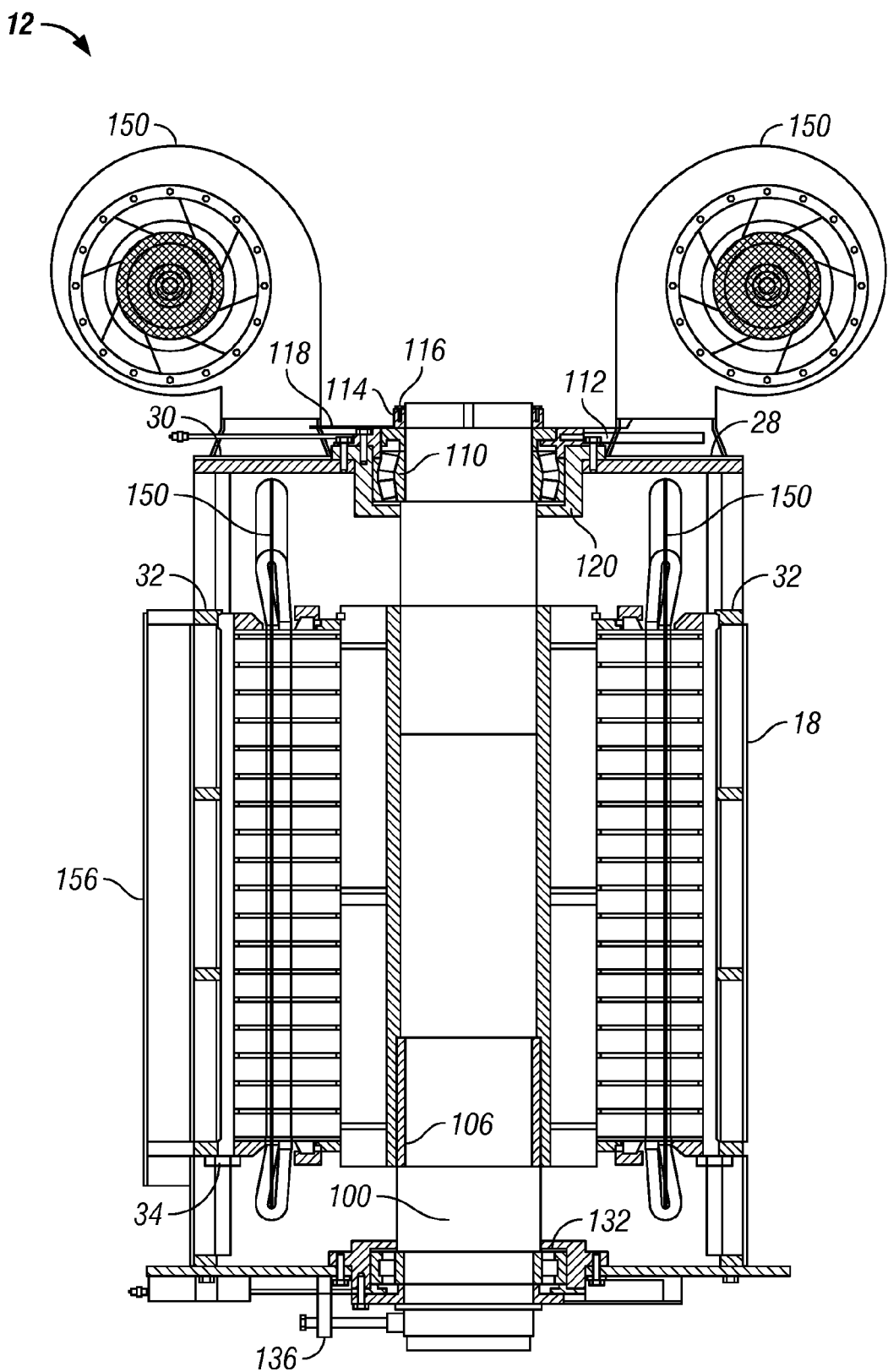
FIG. 7 illustrates a cross-sectional view of an AC motor according to the present invention.

The preferred stator assembly 16 installation method comprises, positioning the outer casing 18 in vertical orientation so that the stator assembly 16 can be lowered into the casing, heating the outer casing 18 sufficiently to overcome the interference fit of the unheated or cooled stator assembly, orienting the stator assembly 16 to the outer casing 18 and lowering the stator assembly 16 into the outer casing 18. As shown in FIG. 7, outer casing 18 has one or more stator stops 32, such as a shoulder, to positively locate the stator assembly within the casing. Additional fixations, such as welds or fasteners, may be used to limit axially and/or rotational movement of the stator assembly 16 relative to the outer casing 18. The spiral dowels of the preferred embodiment added by drilling through guide holes 34 in the outer casing 18 and into one or more of the stator compression plates 60.

Figure 8:
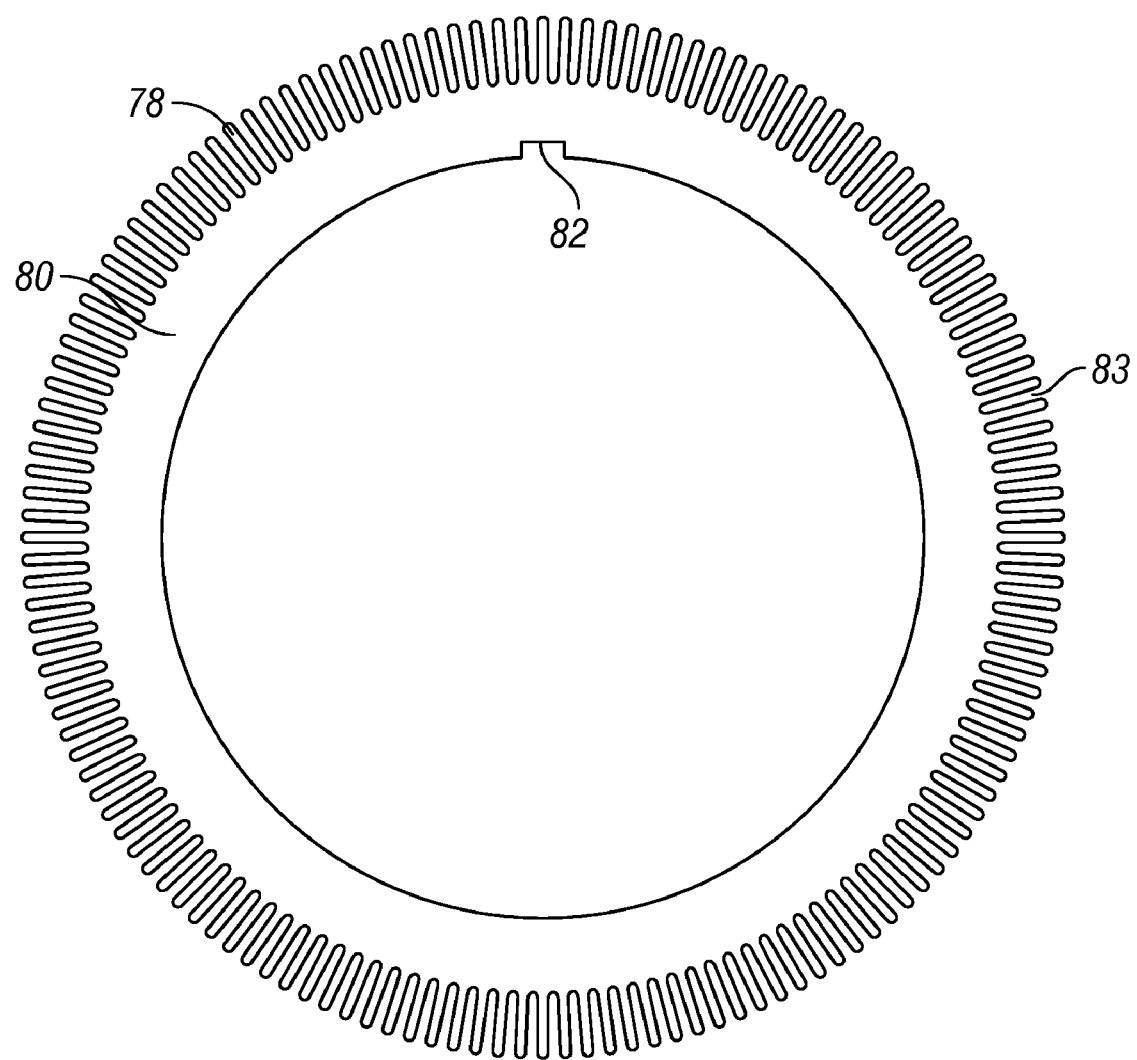
FIG. 8 illustrates a rotor lamination that may be used in an AC motor according to the present invention.

Turning now to the rotor, as illustrated in FIG. 8, the rotor assembly 14 may be fabricated from the same or similar material from which the stator assembly 16 is fabricated. In the preferred embodiment, the rotor laminates 80 are 0.5 mm thick pre-coated laminates similar, or identical to, the material used for the stator laminates 40. As will be described in more detail below, each rotor laminate 80 may have one or more orienting device, such as keyway 81, to orient the laminates relative to the rotor assembly 14. Each rotor laminate 80 has a plurality of rotor slots of conventional AC motor design. For the preferred embodiment described herein, each rotor laminate has 160 rotor teeth 78 and slots 83.

Similar to the stator assembly 16, the rotor assembly 14 is comprised of a plurality of rotor packs 82, each pack comprising a plurality of individual laminates 80. See FIG. 9. In the embodiment presently described, each rotor pack 82 comprises approximately 132 laminates 80 making each rotor pack 82 some 66 mm thick. See FIG. 10. Just like in the stator assembly 16, each rotor pack 82 may be spaced apart from its adjacent pack 82 for heat transfer purposes. In the preferred embodiment, the rotor assembly 14 uses metal strip spacers 50 that are about 10 mm wide by 3 mm thick between adjacent rotor packs 82. The spacers may be affixed to the surface of the exposed adjacent laminates 80, preferably by welding. In the preferred embodiment, these strips form channels 84 for the cooling system.

The assembly of rotor packs 82 may also be completed at each end with a transfer plate 86 and a compression plate 88 to maintain pressure on the individual rotor teeth within each rotor pack 82. As with the stator, the compression plate and transfer plate may be combined. In the preferred embodiment, the compression plate 88 is relieved such that it can dish slightly when pressure is applied, ensuring the pressure is applied at the centroid of the lamination. See FIG. 10.

Figure 9:
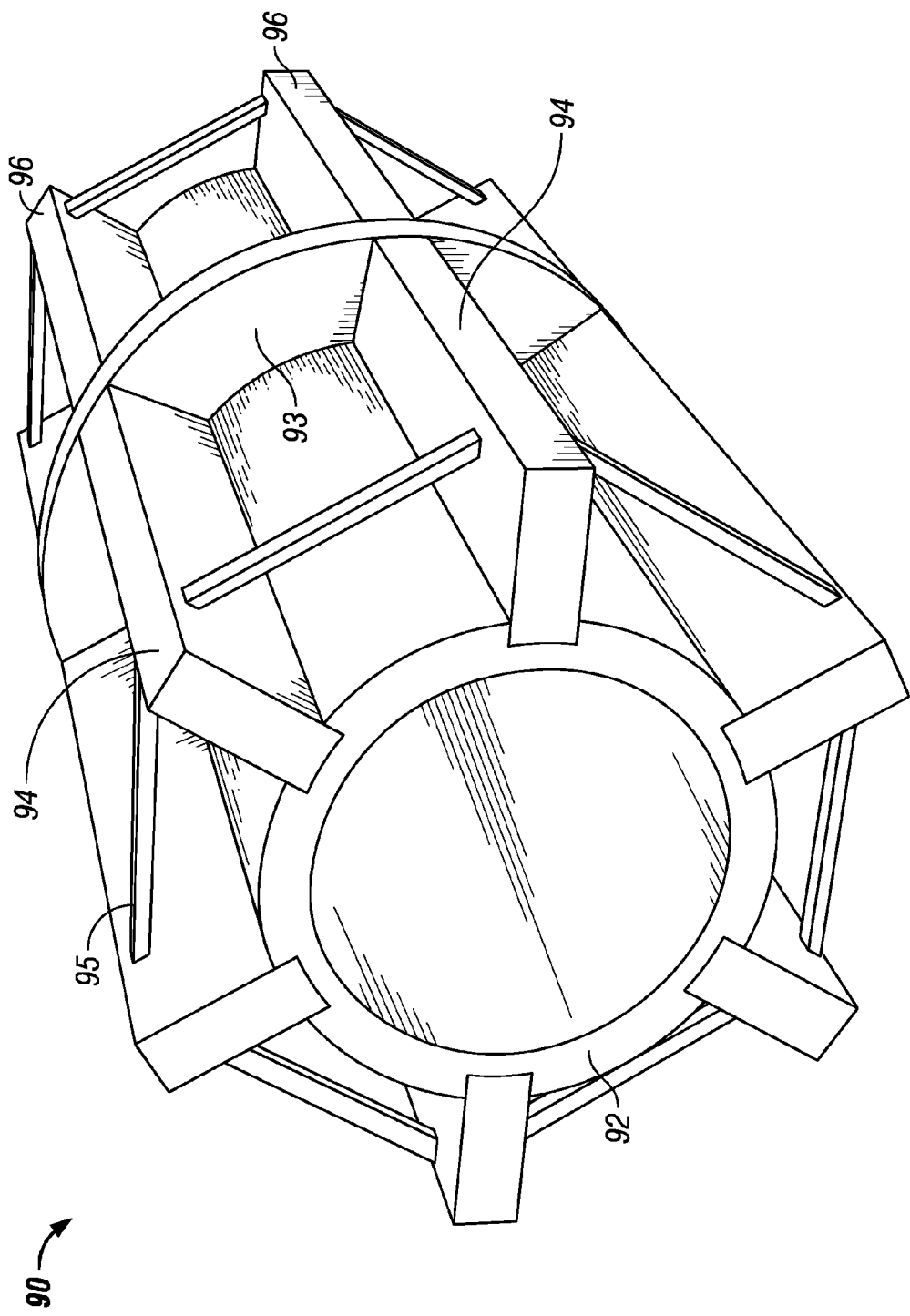
FIG. 9 illustrates a rotor spider that may be used in an AC motor according to the present invention.
Figure 10:
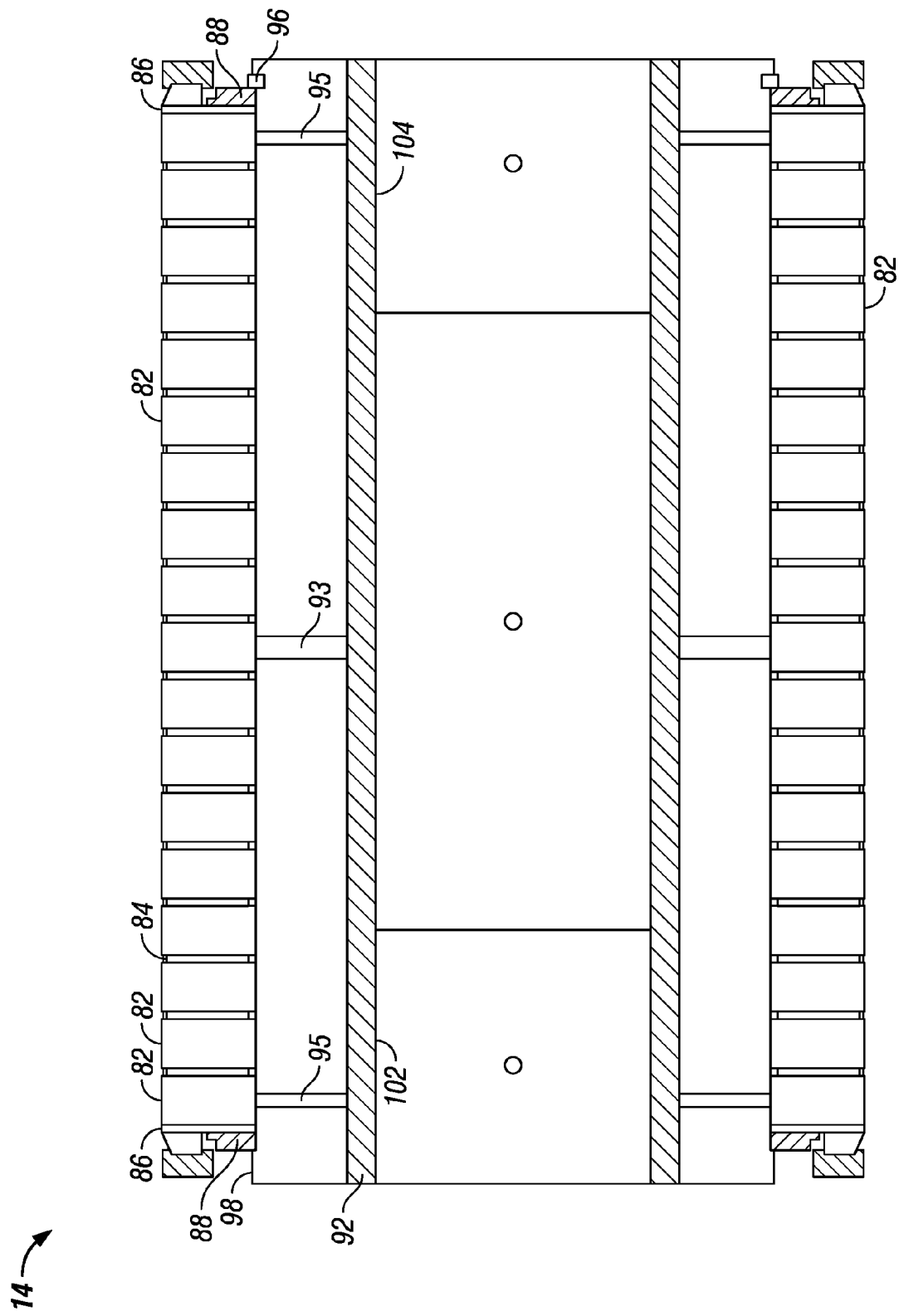
FIG. 10 illustrates a cross section of a rotor assembly pack for an AC motor according to the present invention.

The assembly of rotor packs 82 are assembled on to a rotor spider 90, a preferred embodiment of which is shown in FIGS. 9 and 10. The preferred rotor spider 90 comprises a central hollow tube 92 with a plurality of radially extending ribs or legs 94. FIG. 9 shows the rotor spider 90 with six radially extending spider legs 94 spaced about the circumference of the tube 92. The longitudinal axis of the legs 94 aligns with the longitudinal axis of the tube 92. The legs 94 may be dadoed or recessed into the tube 92 and welded to ensure geometric accuracy when fabricating the spider. The spider 90 is designed such that one leg 94 can react 500% of the full load torque of the motor without appreciable plastic deformation. One end of one or more legs 94 has a shoulder 96 against which the rotor packs 82 are located. The spider 90 has a central disc 93 that separates the spider into two cooling circuits. As shown in FIG. 10, stiffening ribs 95 may be used on the legs 94 to reduce vibration due to intermittent cutting during the machining of the spider 90.

Preferably, each laminate 80 and, therefore each rotor pack 82 has a slight interference fit with the outer surface 98 of legs 94. Additional fixation of the rotor packs 82 to the spider 90 may be supplied may be supplied by several means, such as a keyway 81 shown on FIG. 8. The assembly of rotor packs 82 (FIG. 10) is compressed under about 100 psi against spider shoulder 96 and the assembly is locked in placed on the spider legs 94. Conductors, preferably copper bars, are positioned in the rotor slots 83 and then secured in place. The conventional Barlock system using spring dowels is suitable to this task.

The rotor spider 90 is preferably shrink fitted to the motor shaft 100 (See FIGS. 6 & 7). Inside diameter sections 102 and 104 at each end of the spider tube 92 provide the interference fit (FIG. 10), with the section between being a clearance fit to the motor shaft 100. This interference fit arrangement allows dimensional accuracy to be maintained during machining of the inside diameter surface of the tube 92. Otherwise, the reach of the machine tool would be very long and may lead to difficulties maintaining dimensional tolerances. The interference fit is designed to transmit a minimum of 230% full load torque, which is calculated at minimum fit. An allowance has been made for the temperature of the drilling mud traveling through the hollow motor shaft 100. Any temperature differential between the shaft 100 and the spider 90 will increase the interface pressure between the shaft 100 and the spider 90. It is assumed that a temperature difference of 60° C. may be possible, given that the maximum temperature of the mud is about 100° C. The interference fit between the shaft 100 and the spider 90 may be designed, and in the preferred embodiment has been designed, to provide a compromise between torque transmission and stress. Also, in the preferred embodiment, the shrink fit is augmented with an axial key 106 on one section 102 or 104 only (FIG. 7).

Figure 11:
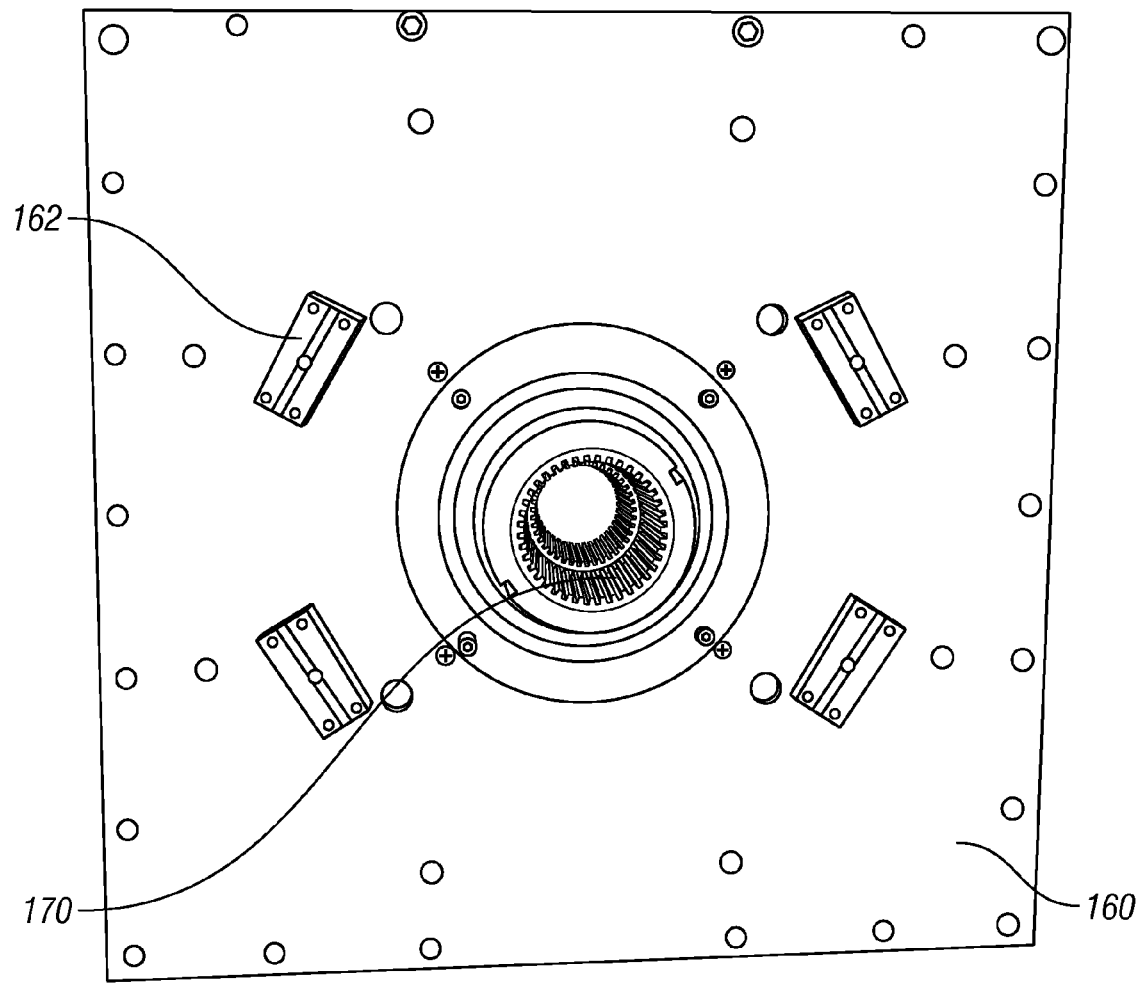
FIG. 11 illustrates an end view of the AC motor illustrated in FIG. 2.

FIG. 11 shows an driving end view of a preferred motor 12 for a top drive drilling system 10. The motor endplate 160 is provided with one or more attachment points 162, such as pads, to attach a mechanical braking system (24 in. FIG.1). In the preferred embodiment, a disc brake rotor 142 (FIG. 1)is attached to the motor shaft 100 and one or more, four, and preferably calipers are mounted on the end plate 160. The edge of the disc 142 may function as a register for the speed encoders 22 for the variable frequency drive 13. Also seen in FIG. 11, are internal splines 170 in motor shaft 100. In the preferred embodiment, two sets of splines 170 are separated by a groove or other structure adapted to accept a seal (not shown), such as an elastomeric O-ring. The splines 170 allow the driven shaft or pipe 172 (not shown)to move relative to motor shaft 100 and the seal prevents fluid communication (such as drilling mud) outside of the motor shaft 100/driven pipe 172 assembly.

Returning to FIG. 7, the rotor assembly 14 and motor shaft 100 are shown positioned in the motor casing 18. The top rotor bearing 110 is a spherical roller bearing, such as an SKF model QJ 1068 M. For horizontal motor applications, such as draw works, SKF model 23068 CC/W33 M may be used. These bearings have a design life in excess of 100,000 hours based on a rotation speed of 150 rpm and thrust from the motor rotor only. Theses bearings are grease lubricated and the grease nipple may be positioned near an edge of the motor 12 to force grease between the two rows of rollers. Excess grease may be expelled into a grease relief chamber 112, which can be emptied as needed. In the preferred embodiment, the bearing 110 is held in place with a shaft nut 114, together with a locking tab washer 116. Beneath the nut 114 is a thrower to prevent rainwater for collecting on top of the bearing seal. No seal between the bearing and the motor is used in the preferred embodiment. The top bearing bracket 120 is fitted with insulation to prevent conduction of potentially damaging currents through the bearing. The fasteners retaining the bracket are fitted with insulating washers and sleeves to prevent bridging of the insulation. The bearing bracket also sits on a raised platform to reduce the possibility of bridging the insulation with standing water.

The bottom rotor bearing 130 may be a cylindrical roller bearing, such as SKF model NU 1072M, which is suitable for vertical or horizontal motors 12. This bearing has a life in excess of 100,000 hours as well. The grease arrangement for this bearing is similar to the top bearing 110. The bottom bearing 130 has an inboard seal 132 to protect the bearing from any ingress of water caused by build up within the motor. The bottom bearing may be fitted with a simple clamp 136 to lock the bearing in place to prevent vibration damage in transmit. The clamp 136 simply pushes the bearing hard over in its clearance. Clamp 136 must be withdrawn prior to operation of the motor 12.

The effect of the drilling mud temperature on the bearings 110 and 130 should be taken into account. The effect of the mud passing through motor shaft 100 will be to increase the temperature of the inner bearing race and thereby possibly reducing the clearance in the bearing. While it is tempting to increase the bearing clearance to account for this effect, it is possible that the bearing clearances will be too large when the bearing is cold (i.e, not heated by the drilling mud) and the bearing could be damaged. In the preferred embodiment, and because of the relatively slow rotational speed of the motor shaft 100, standard bearing clearances are used.

The motor 12 may be cooled in a variety of manners, but in the preferred top drive embodiment disclosed herein the motor 12 is cooled by forced air circulation. Ambient or cooling air is introduced from the top or non-driving end of the motor 12 through cooling ports 28 and 30. In the preferred embodiment, separately powered 15 hp centrifugal fans 150 are mounted on the top of the motor 12 to supply the cooling air. Each fan can operate at about 3,000cfm. If one fan fails, this arrangement allows the motor to continue to operation, perhaps at lower output. Each cooling port 28 and 30 has a baffle 150a that effectively splits the air stream into two components, one component for the top half of the motor 12 and the other component for the bottom half of the motor 12. Based on heat transfer analysis, additional baffling may be provided in each fan to apportion the amount of air that is split by the baffles 150a. The air passes over the stator end windings and into the pie-shaped spider sections 159 (not shown) from each end. The air is then expelled through radial channels between the rotor packs 82 and into adjacent radial channels in the stator assembly 16.

Allowing the air to enter the top and bottom of the motor 12 from two points improves the distribution of the cooling air in the motor 12. The air is expelled from the motor on both sides through exhaust manifolds 156 (FIG. 7) down and away from the motor 12 to reduce the risk of air re-circulation. The exhaust manifolds are designed to prevent ingress of rainwater into the motor 12.

The motor 12 as described herein may be implemented in a variety of devices such as top drive drilling systems, drilling draw work systems, pumps, dredging equipment, mining vehicles and numerous other applications in which low speed (e.g., 0 to 300 rpm) power is required. The present invention obviates the need for expensive and maintenance intensive speed reduction equipment.

The foregoing description of preferred and other embodiments is not intended to limit or restrict the scope or applicability of the inventive concepts conceived of by the Applicants. In exchange for disclosing a preferred embodiment of the present invention, the Applicants desire the broadest scope for the appended claims allowed by the patent laws.

We claim:

1. A top drive drilling system using a low speed AC motor, comprising:
   a motor frame,
   a low speed AC motor including:
      a stator assembly affixed to the motor frame and comprising a plurality of stator laminates compressed into a stator core;
      a spider comprising a hollow tube having a plurality of ribs located on the outer tube surface and oriented such that the length of the ribs are coincident the length of the hollow tube, wherein each of the plurality of ribs has an outer radial surface;
      a rotor core comprising a plurality of compressed rotor laminates affixed to the outer radial surface of the spider ribs;
   a hollow motor shaft to which the spider is coupled;
   first and second bearing assemblies mounted between the motor frame and the hollow motor shaft such that the rotor core may rotate relative to the stator assembly; and
   a motor drive for generating a variable frequency pulse-width modulation signal to drive the AC motor at speeds of about 0 to 300 rpm thereby avoiding speed reduction equipment.

2. The top drive system of claim 1, wherein the AC motor further comprises three phase delta windings creating 8 poles and the motor drive supplies a base frequency of 10 Hz.

3. The top drive system of claim 1, further comprising:
   a braking assembly and
   the first and second bearings support only the weight of the rotor assembly and braking assembly.

4. The top drive system of claim 1, wherein the stator assembly is doweled to the motor frame to withstand 500% full load torque.

5. The top drive system of claim 1, wherein the rotor spider is dadoed to accept the ribs and the ribs are filet welded to the shaft such that any one rib can withstand up to 500% full load torque.

6. The top drive system of claim 1, wherein the first bearing is a spherical bearing and is electrically insulated from the rotor and motor frame, and wherein the second bearing is a cylindrical bearing and is electrically insulated from the rotor and motor frame.

* * * * *